(12) United States Patent
Pozzi

(10) Patent No.: US 7,695,225 B2
(45) Date of Patent: Apr. 13, 2010

(54) FITTING SYSTEMS ADAPTED ESPECIALLY FOR FIXING SEAT POSITIONS

(75) Inventor: Alexander Pozzi, Highland Village, TX (US)

(73) Assignee: Weber Aircraft LLC, Gainesville, TX (US)

( * ) Notice: Subject to any disclaimer, the term of this patent is extended or adjusted under 35 U.S.C. 154(b) by 457 days.

(21) Appl. No.: 11/492,745

(22) Filed: Jul. 25, 2006

(65) Prior Publication Data

US 2007/0026707 A1    Feb. 1, 2007

Related U.S. Application Data

(60) Provisional application No. 60/702,133, filed on Jul. 25, 2005.

(51) Int. Cl.
B60P 7/08 (2006.01)
(52) U.S. Cl. .................... 410/105; 410/104; 410/77
(58) Field of Classification Search .................. 410/77, 410/80, 104, 105; 244/118.1, 118.6, 122 R, 244/137.1; 248/503, 503.1
See application file for complete search history.

(56) References Cited

U.S. PATENT DOCUMENTS

| | | | |
|---|---|---|---|
| 3,392,954 A | | 7/1968 | Malitte |
| 3,620,171 A | | 11/1971 | Brenia et al. |
| 4,109,891 A | * | 8/1978 | Grendahl |
| 4,776,533 A | | 10/1988 | Sheek et al. |
| 4,913,489 A | | 4/1990 | Martin |
| 5,337,979 A | | 8/1994 | Bales et al. |
| 5,823,727 A | | 10/1998 | Lee |
| 6,260,813 B1 | | 7/2001 | Whitcomb |
| 6,902,365 B1 | * | 6/2005 | Dowty ................. 410/105 |

FOREIGN PATENT DOCUMENTS

| | | |
|---|---|---|
| DE | 202004015211 | 6/1994 |
| EP | 0021933 | 1/1981 |
| GB | 2219493 | 12/1989 |
| WO | WO-2005028306 A1 | 3/2005 |

* cited by examiner

*Primary Examiner*—Stephen Gordon
(74) *Attorney, Agent, or Firm*—Dean W. Russell; Kilpatrick Stockton LLP

(57) ABSTRACT

Fitting systems and assemblies are detailed. The assemblies are designed principally (although not necessarily exclusively) for use with aircraft seats and supply positive adjustable positioning of a seat or other object, typically actuated with a single turn (or less) of a single tool.

9 Claims, 13 Drawing Sheets

FITTING SYSTEMS ADAPTED ESPECIALLY FOR FIXING SEAT POSITIONS

REFERENCE TO PROVISIONAL APPLICATION

This application is based on and hereby refers to U.S. Provisional Patent Application Ser. No. 60/702,133, filed Jul. 25, 2005, having the same title as appears above, the entire contents of which application are incorporated herein by this reference.

FIELD OF THE INVENTION

This invention relates to fittings and associated systems for securing objects to elongated tracks and more particularly, but not exclusively, to anchoring assemblies designed to fix positions of passenger seats within an aircraft or other vehicle.

BACKGROUND OF THE INVENTION

Aircraft and certain other vessels configured for transporting passengers typically include elongated tracks bolted or otherwise connected to their floors. These tracks conventionally contain channels formed by a lower, generally horizontal wall and spaced side walls extending upward therefrom. Integral with the side walls may be inwardly-extending flanges spaced from, but generally parallel with, the lower wall. Formed periodically in the flanges may be crescent-shaped cut-outs, creating generally circular receptacles spaced longitudinally within the elongated track.

U.S. Pat. No. 5,337,979 to Bales, et al., whose contents are incorporated herein in their entirety by this reference, illustrates and discusses examples of such elongated tracks. Also disclosed in the Bales patent are fittings for these tracks. The fittings include fingers adapted to slide along the lower walls of the tracks. Rear boss portions formed with the fingers include plungers biased toward the lower surfaces of the tracks and adapted to be received by the receptacles.

U.S. Pat. No. 5,823,727 to Lee, whose contents also are incorporated herein in their entirety by reference, addresses additional fittings for elongated tracks. According to the Lee patent, fittings with bell-shaped bases may be teamed with abutting "buttons" having inwardly-flared areas to prevent the fittings from moving longitudinally within the tracks. Washers and lock nuts also may be used to retain the positions of the fittings for later attachment of an object.

Yet another anchoring fitting for an aircraft seat is detailed in U.S. Pat. No. 6,260,813 to Whitcomb. The fitting slides along the channeled tracks of the aircraft, with a separate locking pin remote from the fitting employed to fix the position of the seat. The contents of the Whitcomb patent too are incorporated herein in their entirety by reference.

SUMMARY OF THE INVENTION

The present invention provides alternate fitting systems and assemblies for use principally, but not necessarily exclusively, for aircraft seats. The systems are designed to supply positive adjustable positioning of a seat or other object, actuated with a single turn (or less) of a single tool. They additionally are adapted for use with the conventional channeled tracks described in the preceding section.

Beneficially included as part of the systems is a base frame positioned for movement within the track. The base frame also functions as mounting structure both for linkages to an associated seat and for internal components of a fitting assembly. To help fulfill this latter role, the frame may include horizontally- and vertically-oriented openings.

Positioned in a vertically-oriented opening of the base frame of a preferred embodiment of the invention is a rod. The rod is designed to travel vertically within the frame. It also supports an associated plunger, which similarly travels vertically within the frame and is designed to engage a track. The plunger additionally may have flanges and pins, with the former helping reduce vertical motion (rattle) of the fixed seat or other object and the latter providing positive locking against fore and aft movement of the fixed object.

Fitting assemblies of the present invention further may include cams and cam followers. A cam follower may be attached to the rod through one or a series of disc springs and transmit vertical force from a cam to the rod and plunger, ultimately supplying clamping force against the track. This clamping force reduces the vertical motion, or rattle, of the seat or other object mentioned in the preceding paragraph.

In these embodiments, the cam may be positioned through a horizontally-oriented opening in the base frame so as to translate rotational force into the more linear, vertical force applied to the cam follower. Flat areas of the cam permit positive stops for locking purposes. By protruding out the side of the base frame, further, motion of the cam may be actuated by a tool likewise positioned to the side of the base frame. Allowing side access to the actuation mechanism is often beneficial, as typically fewer space constraints exist to the side of the base frame than above or below it.

Other components of exemplary assemblies of the invention may be coil springs and caps. Positioning a coil spring between the base frame and rod provides upward bias to the rod and plunger, ensuring they are fully retracted when the assembly is unlocked (i.e. as for movement of the associated object). A cap, finally, may be attached to an upper section of the rod and employed to encapsulate the remainder of the fitting assembly. Such a cap additionally may function to limit the axial and rotational travel of the cam and, if desired, provide positive indication of whether the assembly is locked or unlocked.

In operation, a tool (such as but not necessarily limited to an Allen wrench) may be used to rotate the cam and, depending on the rotation direction, either depress or retract the plunger. When the plunger is retracted, the cap is in its uppermost position (as an indicator that the assembly is unlocked), and the assembly does not prohibit movement of the base frame and attached object. By contrast, when the plunger is depressed, it engages the track and thereby inhibits movement of the frame and object. When the plunger is fully depressed, the cap is in its lowermost position (indicating the assembly is locked), with the coil and disc springs compressed.

It thus is an optional, non-exclusive object of the present invention to provide improved fitting systems and assemblies.

It is also an optional, non-exclusive object of the present invention to provide fitting systems and assemblies especially adapted for use with aircraft seats.

It is another optional, non-exclusive object of the present invention to provide fitting systems and assemblies requiring no more than a single turn of a single tool to positively adjust (and lock) the position of an article.

It is a further optional, non-exclusive object of the present invention to provide fitting systems and assemblies in which depressible plungers interact with features of elongated flooring tracks to lock an article in position longitudinally.

It is, moreover, an optional, non-exclusive object of the present invention to permit the actuation tool to engage a cam through the side of the base frame.

It is yet another optional, non-exclusive object of the present invention to provide fitting systems and assemblies which provide visual indication of whether an associated object is, or is not, locked in place in a track.

Other objects, features, and advantages of the present invention will be apparent to those skilled in the relevant field with reference to the remaining text and drawings of this application.

DETAILED DESCRIPTION

Figure 1:
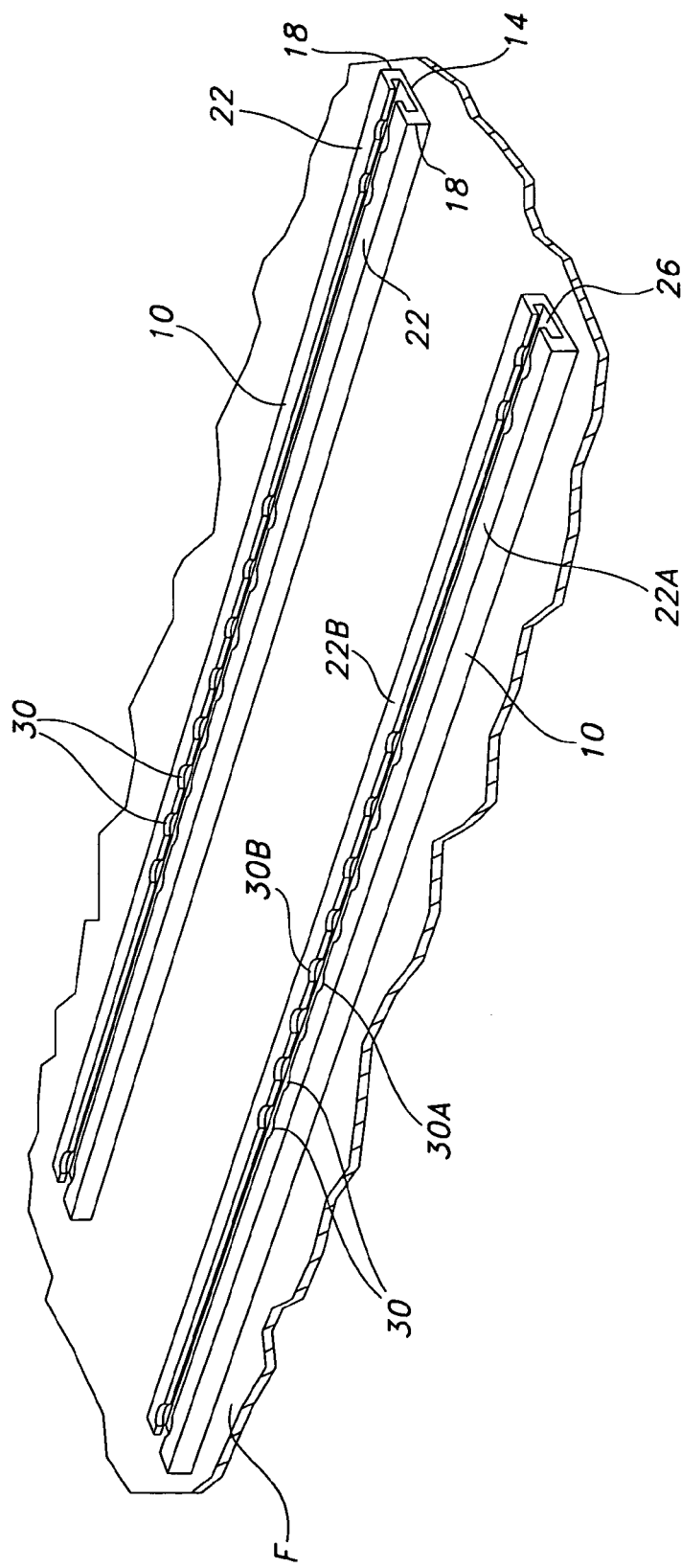
FIG. 1 is a perspective view of an exemplary pair of tracks to which fitting assemblies of the present invention may be attached.

Illustrated in FIG. 1 is an example of a pair of tracks 10 useful in connection with the present invention. Such tracks 10 are shown mounted in parallel paths to floor F of an aircraft, other vehicle, or other device or object. As detailed in FIG. 1, each track 10 may comprise lower wall 14, side walls 18 extending upward therefrom, and a flange 22 extending inward from each side wall 18. Track 10 thus forms an elongated channel 26.

Figure 2:
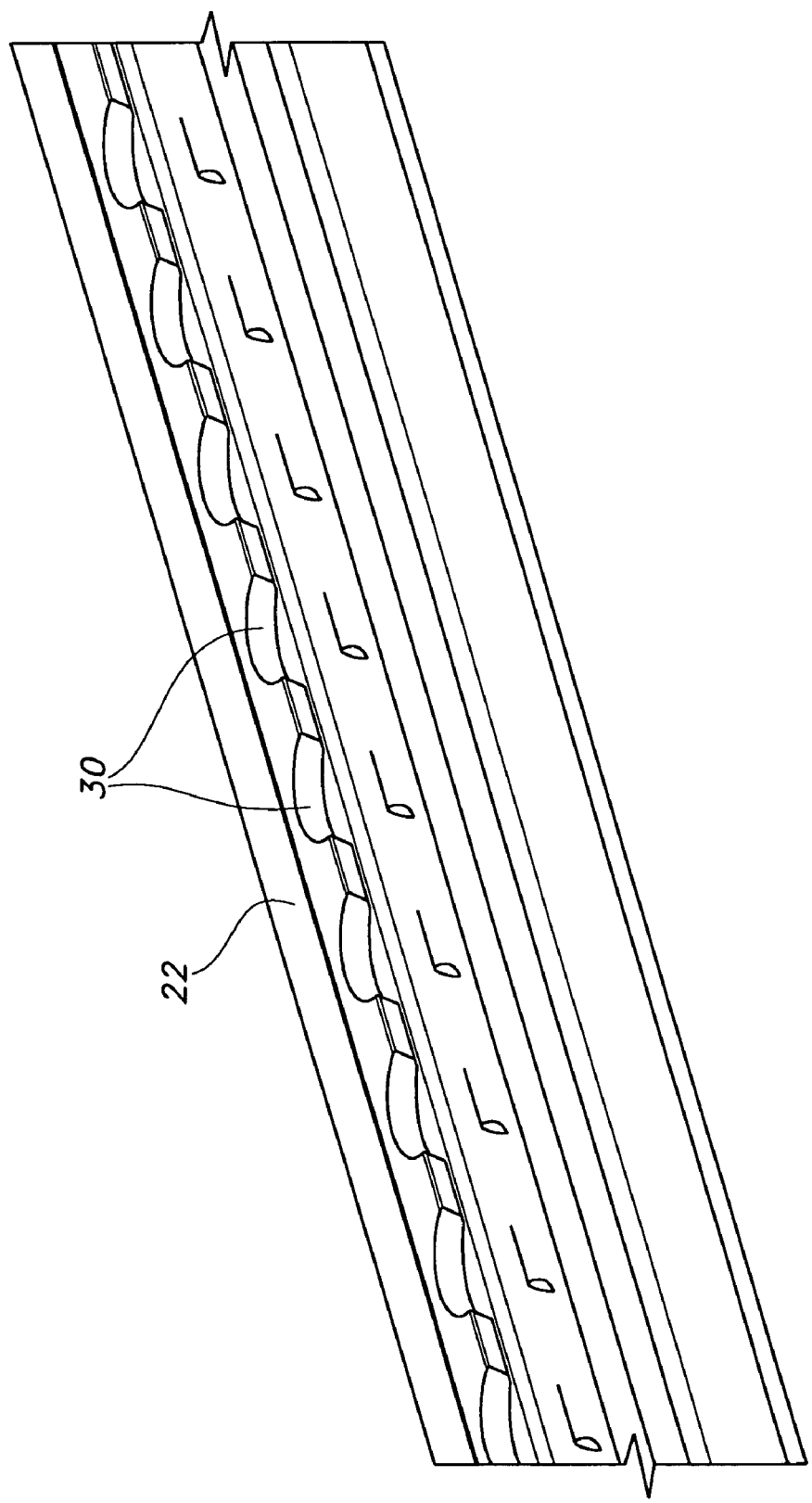
FIG. 2 is a cut-away view of a portion of a track of FIG. 1.

Also depicted in FIGS. 1-2 are crescent-shaped cut-outs 30 spaced along each flange 22. Spacing of these cut-outs 30 is matched along each flange 22 of a track 30 so that, for example, a cut-out 30A of a flange 22A is opposite a cut-out 30B of flange 22B. By matching spacing of cut-outs 30 in this manner, each pair of opposed cut-outs 30A and 30B forms a generally circular receptacle into channel 26 of a corresponding track 10.

Figure 3:
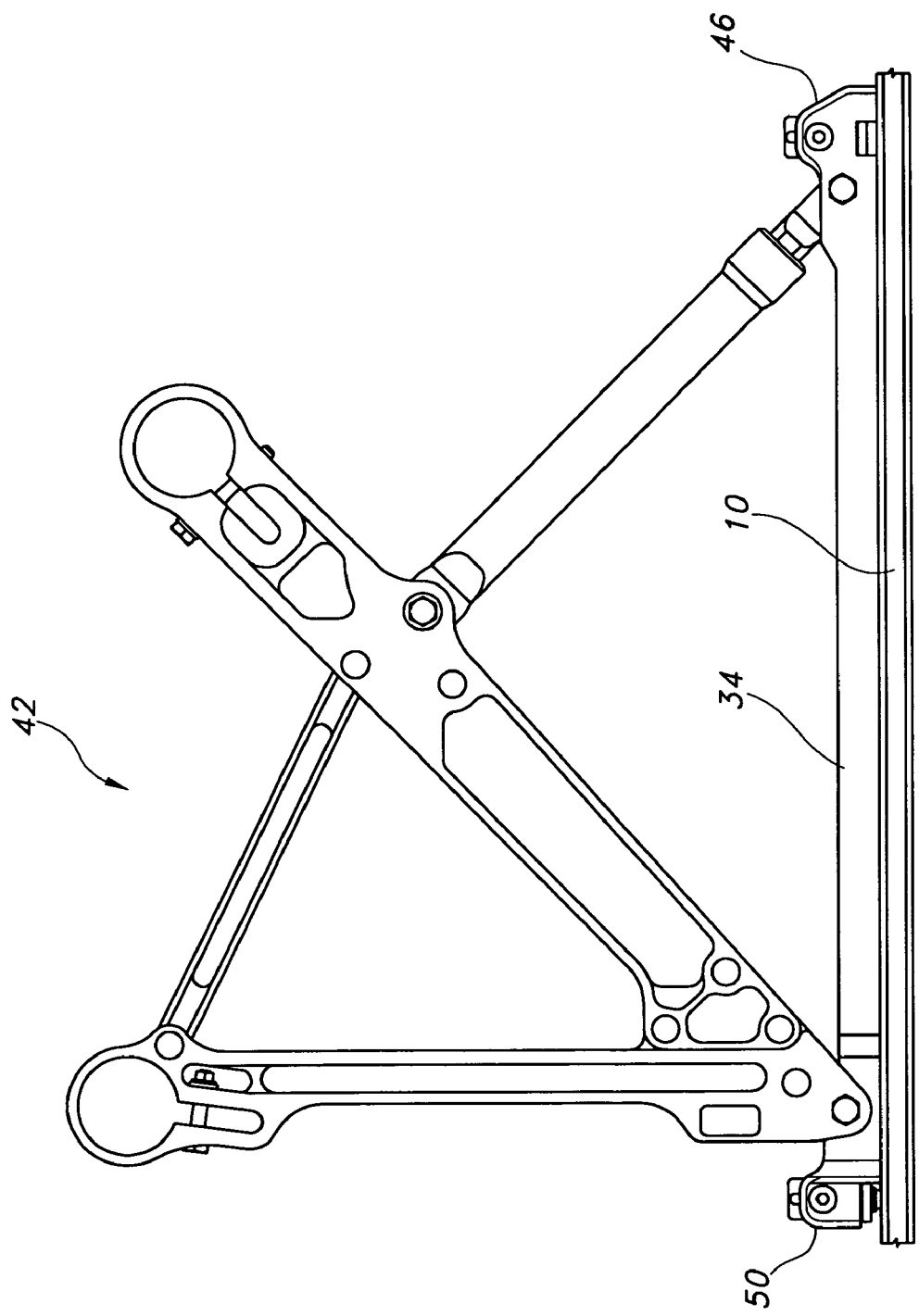
FIG. 3 is a side elevational view of components of a fitting assembly of the present invention, to which components of a vehicle seat are attached, shown in an unlocked position.
Figure 4:
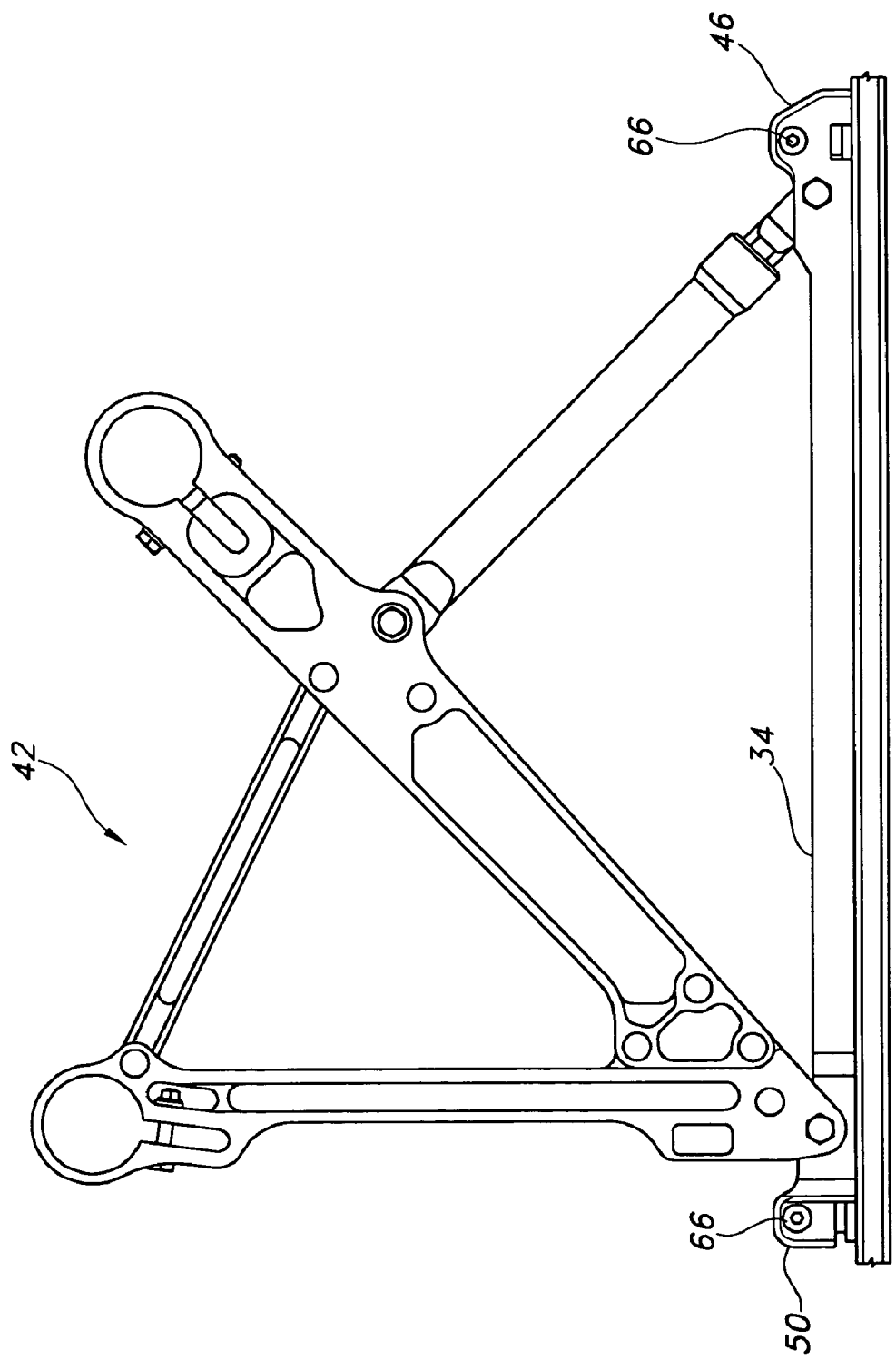
FIG. 4 is a side elevational view of the components of FIG. 3 shown in a locked position.
Figure 5:
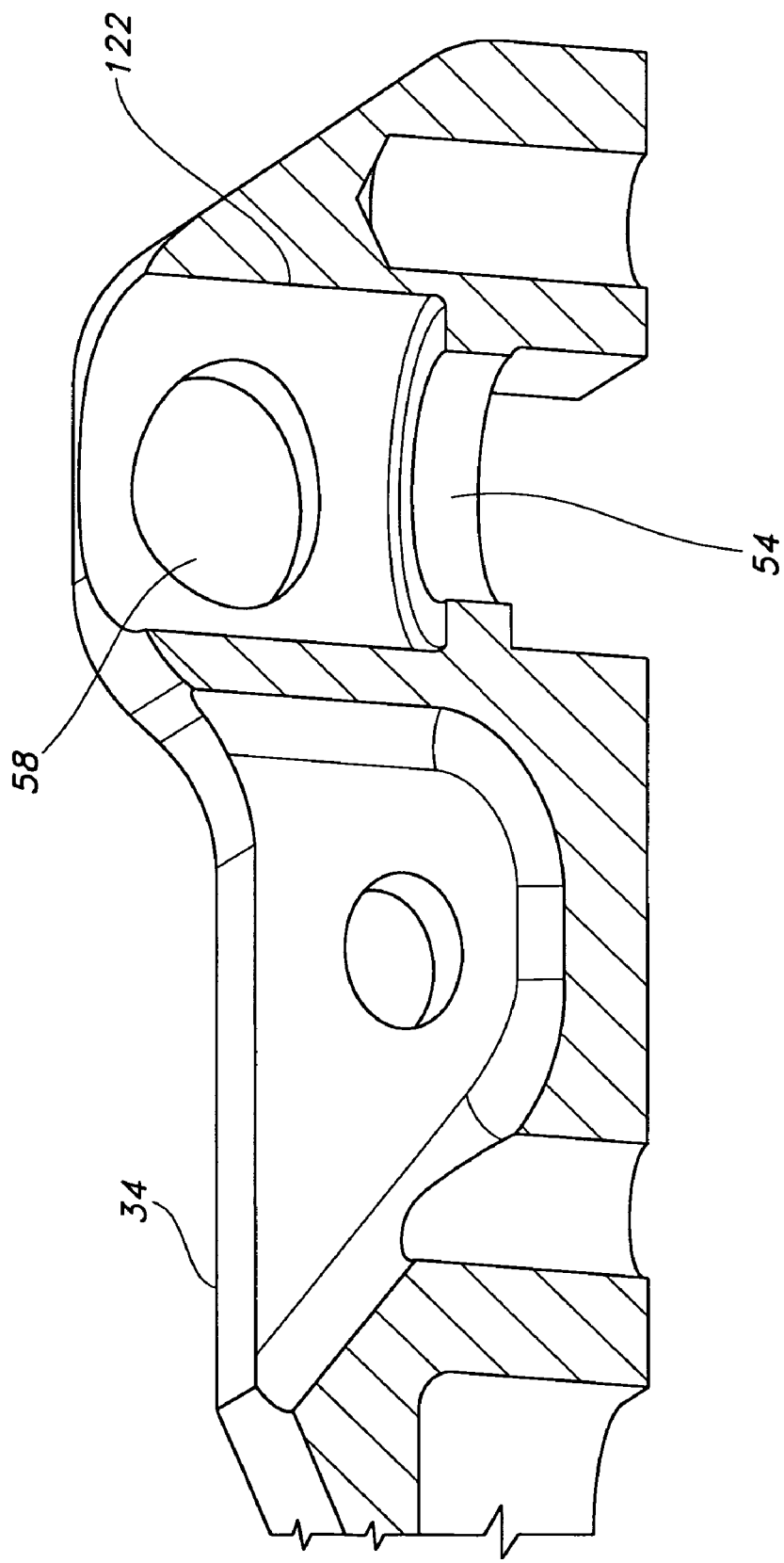
FIG. 5 is a cut-away view of a portion of a base frame of FIGS. 3-4.

FIGS. 3-5 illustrate base frame 34 of a preferred assembly 38 (see FIGS. 12-13) of the present invention. In use base frame 34 is proximate a track 10 and functions to connect article frame 42 of a seat or other article to track 10. Article frame 42 may be attached to base frame 34 in any suitable way.

Proximate at least one end 46 (and preferably both ends 46 and 50) of preferred base frame 34 is a vertically-oriented opening 54 and a horizontally-oriented opening 58. Opening 54 is designed to receive rod 62 (see FIG. 6) and certain other components of assembly 38, while opening 58 allows access to feature 66 of cam 70 (see FIG. 8).

Figure 6:
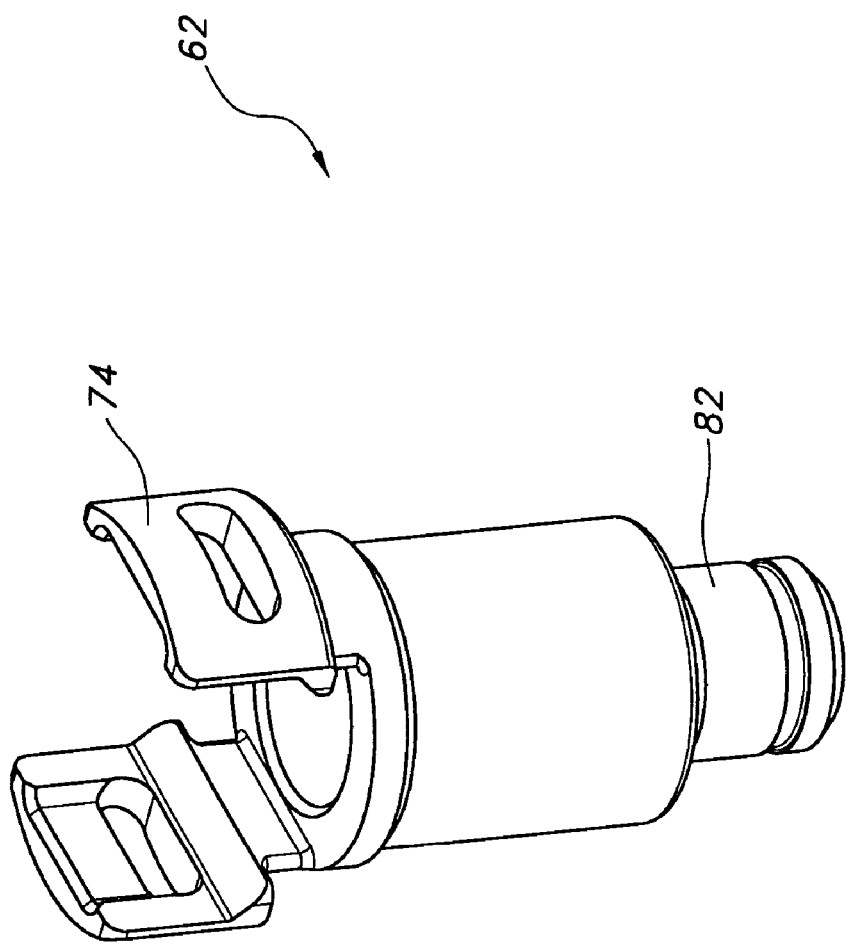
FIG. 6 is a view of a rod of FIGS. 3-4.
Figure 7:
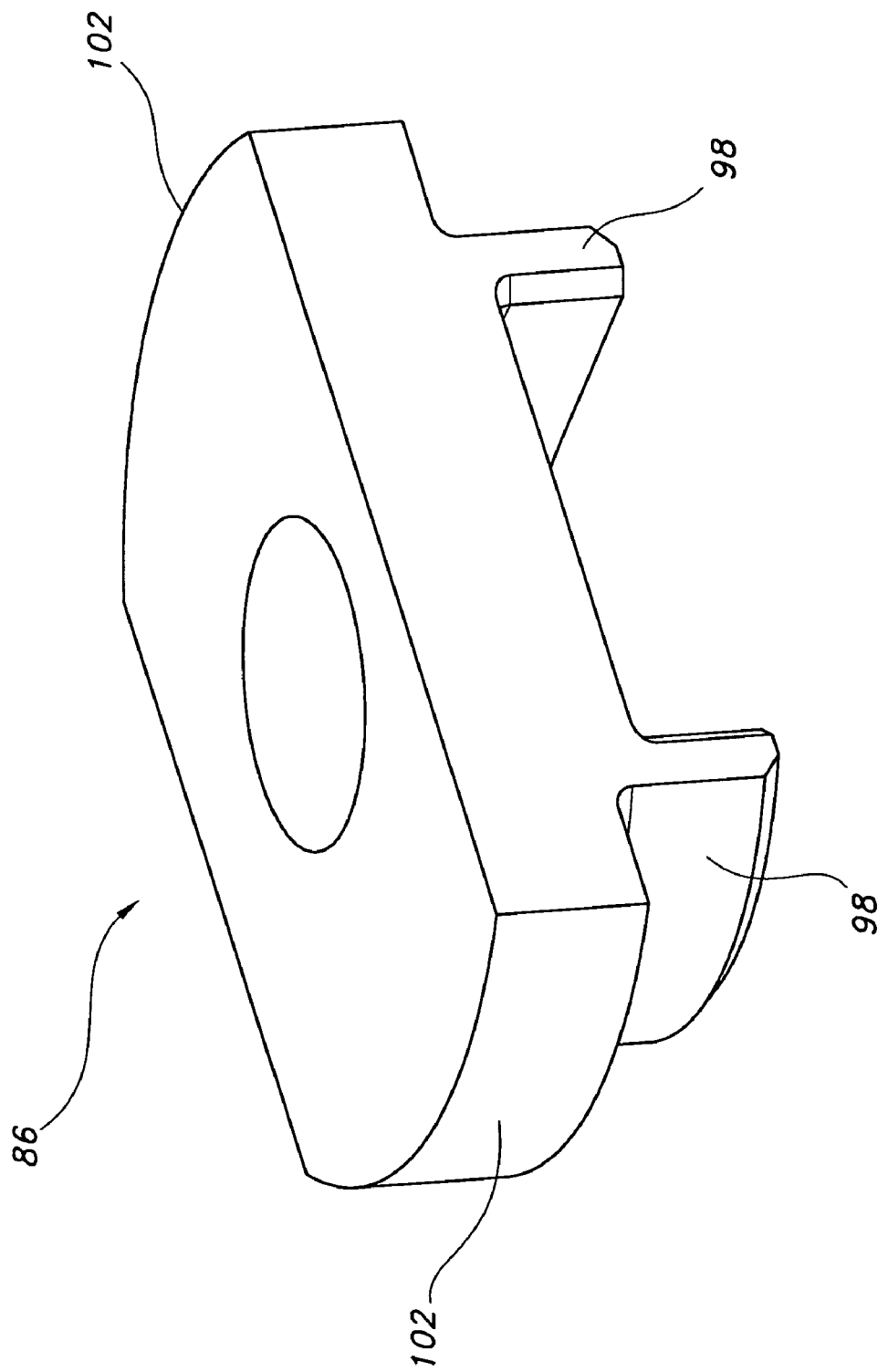
FIG. 7 is a view of a plunger of FIGS. 3-4.

FIGS. 6-13 show various other components of exemplary assembly 38. Detailed in FIG. 6 is rod 62, which may travel vertically within opening 54 of base frame 34. Attached to upper end 74 of rod 62 is cap 78 (see FIG. 11), while attached to lower end 82 of the rod 62 is plunger 86 (see FIG. 7). Plunger 86 and track 10 operate to limit downward travel of rod 62, while cam follower 90 (FIG. 9) and one or more disc springs 94 (FIG. 10) limit upward travel of the rod 62.

Plunger 86 beneficially includes shear pins 98 and flanges 102. When extended downward, plunger 86 engages a pair of matched cut-outs 30 of track 10. Shear pins 98 cooperate with cut-outs 30 of track 10 to prevent forward or aft (i.e. longitudinal) movement of article frame 42. Flanges 102, by contrast, provide surfaces which may be clamped against flanges 22 of track 10, thus inhibiting vertical movement of article frame 42 relative to the track 10. This latter inhibition reduces the likelihood that article frame 42 will rattle in use.

Figure 11:
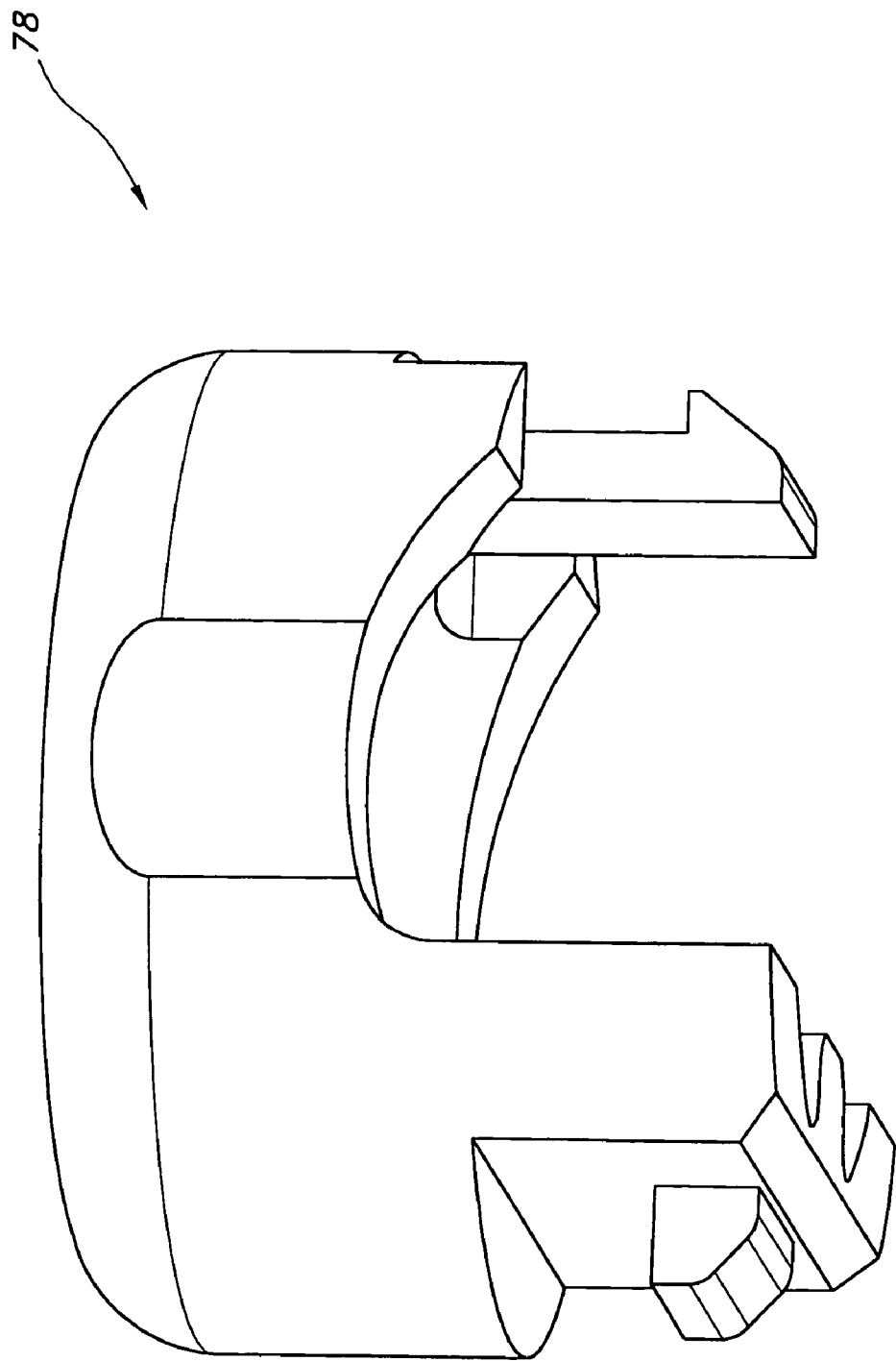
FIG. 11 is a view of a cap of FIGS. 3-4.

FIG. 11 illustrates an example of cap 78 of the present invention. Cap 78 attaches to upper end 74 of rod 62. Preferred assemblies 38 connect cap 78 and rod 62 using a snap-hook arrangement, although those skilled in the relevant art will recognize that other attachment mechanisms may be employed instead. Cap 78 may perform multiple functions as part of assembly 38, including encapsulating other components of the assembly 38 and protecting them from damage. Because of its configuration, cap 78 additionally may limit upward travel and impede rotational travel of rod 62. Finally, because cap 78 may be (i) visible above base frame 34 when assembly 38 is not locked into track 10 and (ii) not visible above frame 34 when assembly 38 is locked into track 10, the cap 78 functions as a visible indicator of the operational status of assembly 38.

Figure 8:
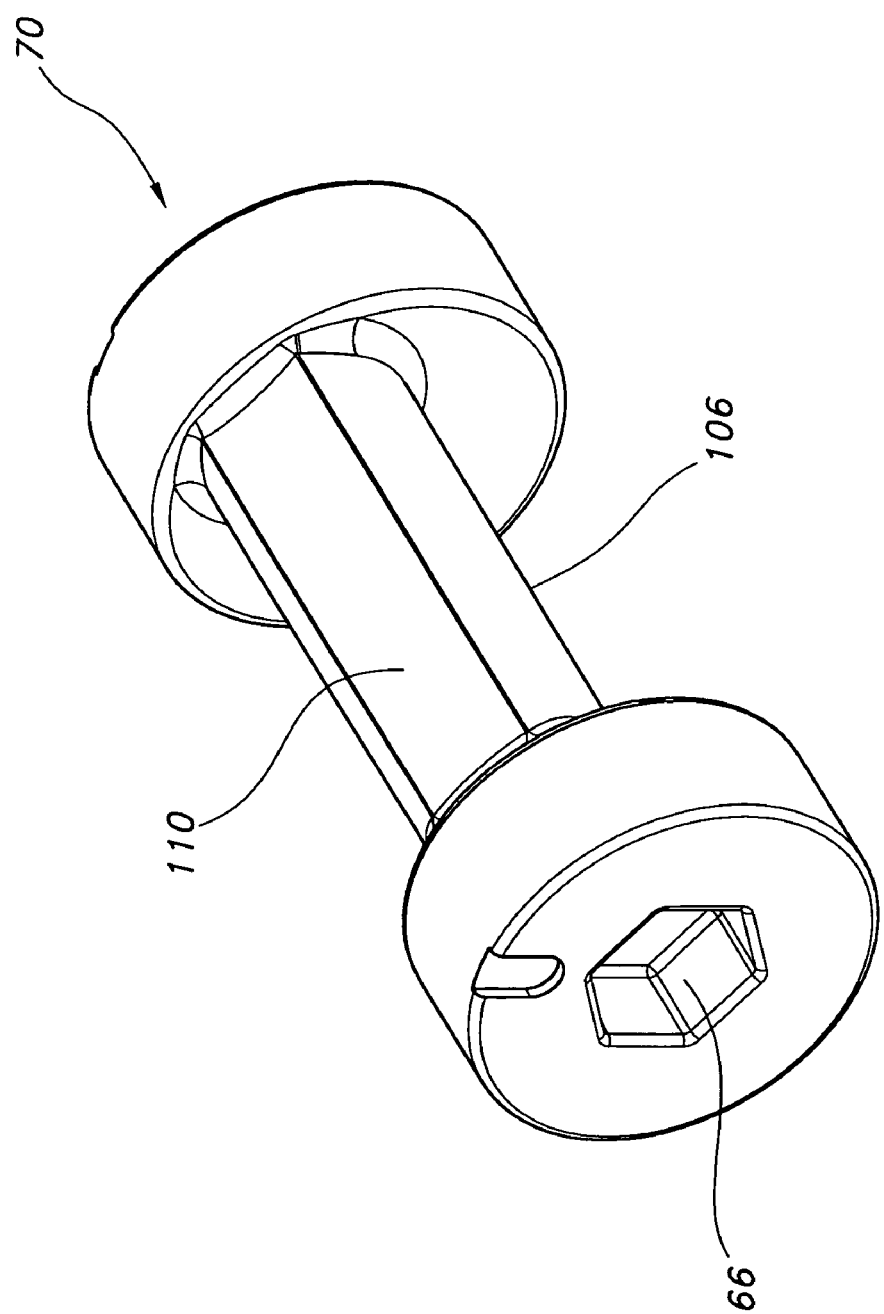
FIG. 8 is a view of a cam of FIGS. 3-4.
Figure 9:
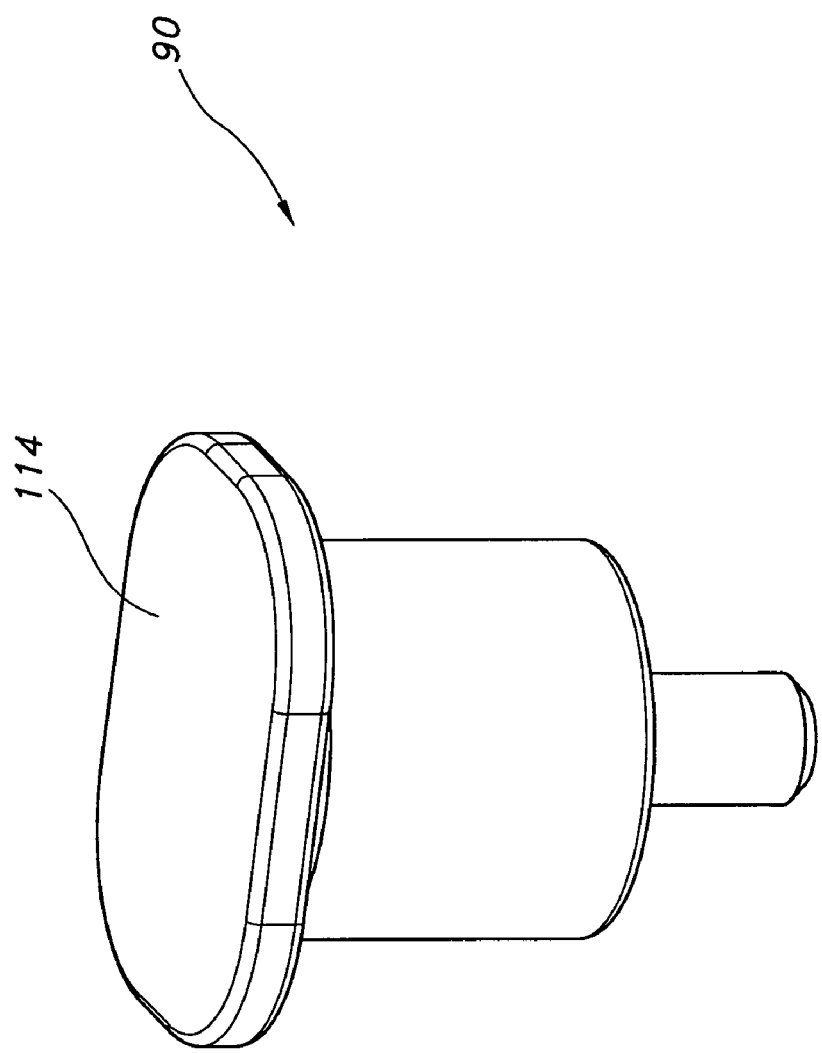
FIG. 9 is a view of a cam follower of FIGS. 3-4.
Figure 10:
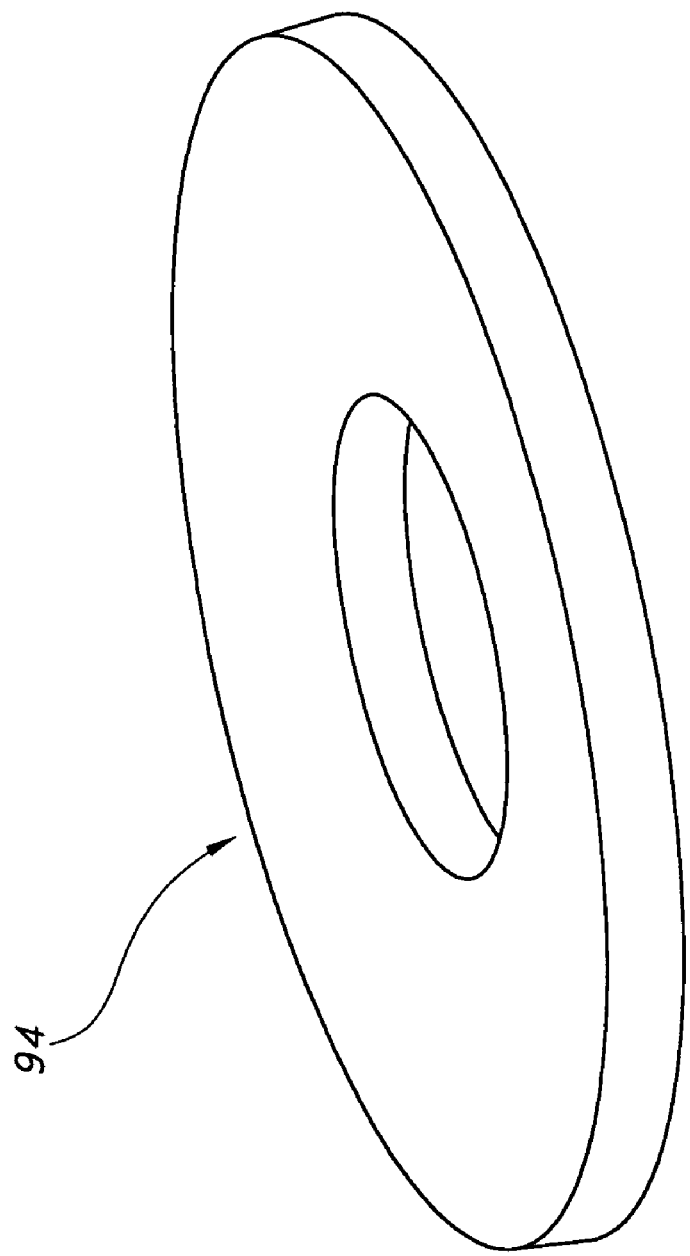
FIG. 10 is a view of a disc spring of FIGS. 3-4.

Cam 70 appears in FIG. 8. Cam 70 is positioned within opening 58 of base frame 34 to that feature 66 is accessible externally of the base frame 34. Although feature 66 is illustrated as comprising a six-sided recess (thus readily receiving a hexagonal Allen wrench or similar tool), it need not necessarily be configured in this manner. Preferably, however, feature 66 is structured so that merely a single turn (or less) of a single tool is necessary to effect change of operational status of assembly 38.

Curved lobe 106 of cam 70 cooperates with cam follower 90 to translate rotational force provided by the tool into linear force on the cam follower 90. When cam 70 is rotated fully, flat section 110 of cam 70 abuts flat surface 114 of cam follower 90, providing a positive stop for the locked position of assembly 38. One or more compressible disc springs 94 may, if desired, be interposed between cam follower 90 and rod 62 to permit application of clamping force while allowing relative movement between the two components. Coil spring 118, finally, may circumscribe rod 62 within larger diameter portion 122 of vertically-oriented opening 54. Spring 118 biases rod 62 and plunger 86 upward, away from track 10, to ensure their full retraction when assembly 38 is unlocked.

Figure 12:
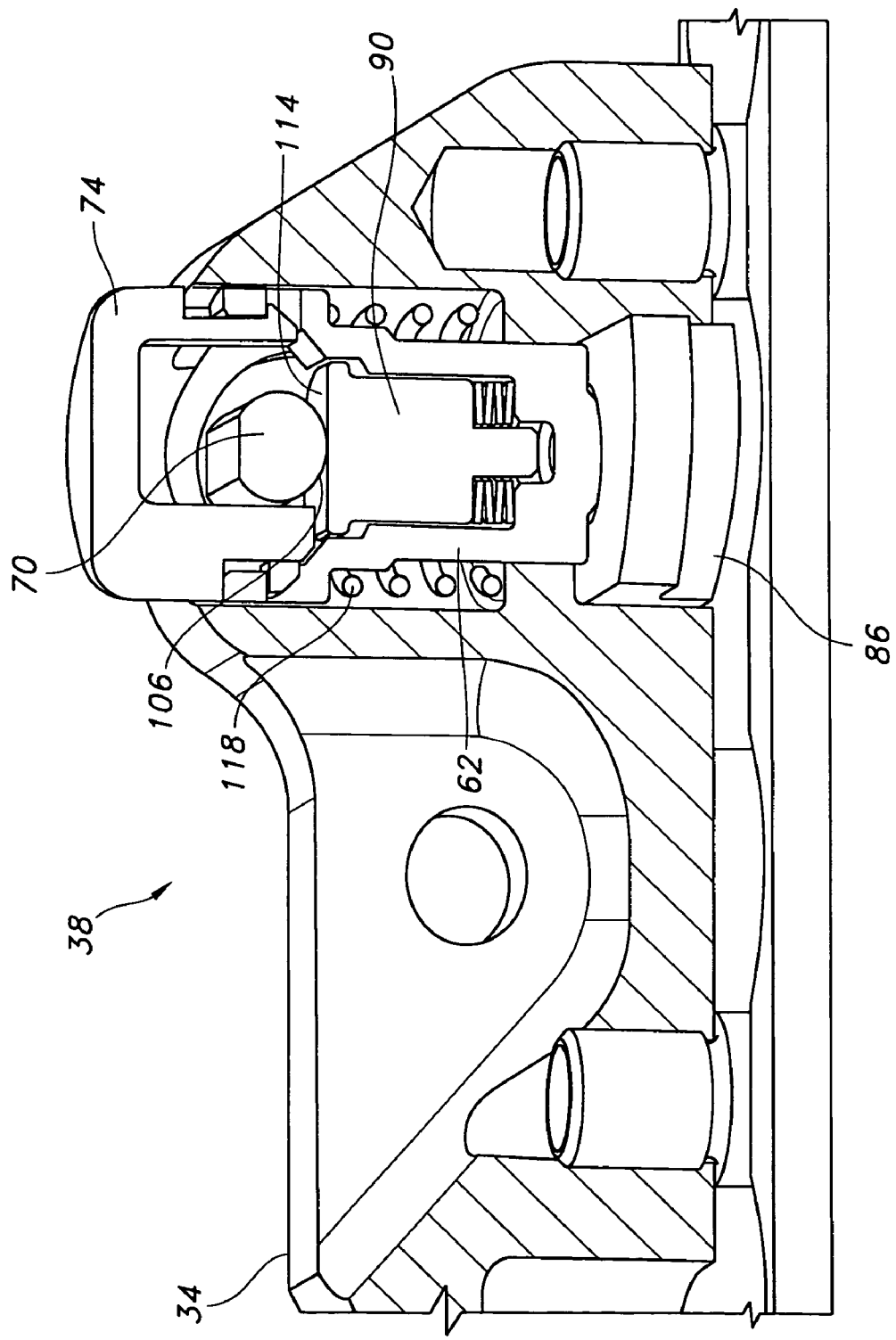
FIG. 12 is a cut-away view of components of FIGS. 3-4 shown in the unlocked position of FIG. 3.

FIG. 12 illustrates assembly 38 in this unlocked position. As shown, plunger 86 is located above flanges 22 of track 10 and thus neither extends into channel 26 nor engages cut-outs 30. Cap 78 protrudes above base frame 34, and coil spring 118 biases rod 62 upward so that surface 114 of cam follower 90 abuts curved lobe 106 of cam 70.

Figure 13:
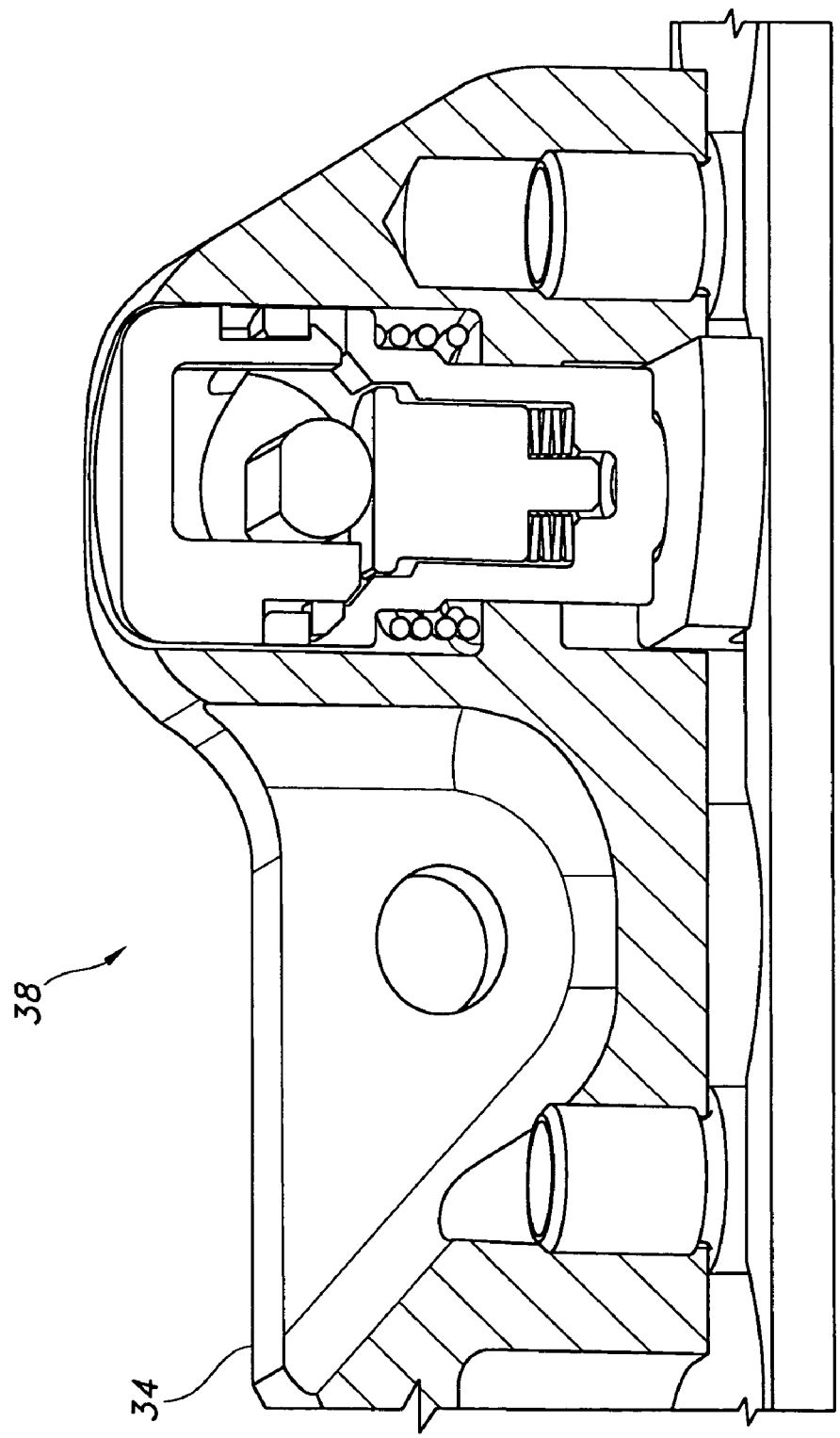
FIG. 13 is a cut-away view of components of FIGS. 3-4 shown in the locked position of FIG. 4.

FIG. 13, by contrast, depicts assembly 38 in its locked position. Rotating cam 70 depresses rod 62 and plunger 86 so that shear pins 98 enter channel 26 and engage cut-outs 30. This rotation also compresses both coil spring 118 and disc springs 94, the latter compression assisting in clamping flanges 102 of plunger 86 against flanges 22 of track 10. When rotation is complete, flat section 110 of cam 70 abuts flat surface 114 of cam follower 90, providing a positive stopping position discernable by the person handling the tool.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

What is claimed is:

1. An assembly for mounting an object to a track having at least one cut-out, the assembly comprising:
   a. a base frame defining a first opening and a second opening;
   b. a rod configured to travel vertically within the first opening;
   c. a plunger attached to the rod and comprising at least one pin;
   d. a cam positioned at least partially within the second opening, having a curved lobe and a flat section, and configured to rotate, under influence of a tool, from a first position in which the assembly is not locked to the track to a second position in which (i) the rod and plunger are depressed and (ii) the at least one pin engages the at least one cut-out so as to lock the assembly to the track; and
   e. a cam follower having a flat surface configured to abut (i) the curved lobe of the cam when the cam is in the first position and (ii) the flat section of the cam when the cam is in the second position.

2. An assembly according to claim 1 in which no more than a single turn of the tool rotates the cam from the first position to the second position.

3. An assembly according to claim 1 further comprising a cap attached to the rod, the cap being visible above the base frame when the cam is in the first position and not visible above the base frame when the cam is in the second position.

4. An assembly according to claim 1 in which the object is a passenger seat.

5. An assembly according to claim 4 in which the track is an aircraft cabin seat track.

6. An assembly for mounting an object to a track having at least one cut-out, the assembly comprising:
   a. a base frame defining a first opening and a second opening;
   b. a rod configured to travel vertically within the first opening;
   c. a plunger attached to the rod and comprising at least one pin;
   d. a cam positioned at least partially within the second opening and configured to rotate, under influence of a tool, from a first position in which the assembly is not locked to the track to a second position in which (i) the rod and plunger are depressed and (ii) the at least one pin engages the at least one cut-out so as to lock the assembly to the track;
   e. a cam follower cooperating with the cam; and
   f. at least one disc spring interposed between the cam follower and the rod.

7. An assembly for mounting an object to a track having at least one cut-out, the assembly comprising:
   a. a base frame defining a first opening and a second opening;
   b. a rod configured to travel vertically within the first opening;
   c. a plunger attached to the rod and comprising at least one pin;
   d. a cam positioned at least partially within the second opening and configured to rotate, under influence of a tool, from a first position in which the assembly is not locked to the track to a second position in which (i) the rod and plunger are depressed and (ii) the at least one pin engages the at least one cut-out so as to lock the assembly to the track; and
   e. means, comprising a coil spring circumscribing the rod, for biasing the rod and plunger upward.

8. An assembly according to claim 1 in which the track has at least one track flange, the plunger further comprises at least one flange, and when the cam is in the second position, the at least one flange is clamped against the at least one track flange.

9. An assembly for mounting an aircraft passenger seat to a track having at least one cut-out and at least one track flange, the assembly comprising:
   a. a base frame defining a first opening and a second opening;
   b. a rod configured to travel vertically within the first opening;
   c. a plunger attached to the rod and comprising at least one pin and at least one flange;
   d. a cam positioned at least partially within the second opening and configured to rotate, under influence of no more than a single turn of a tool, from a first position in which the assembly is not locked to the track to a second position in which (i) the rod and plunger are depressed, (ii) the at least one pin engages the at least one cut-out, and (iii) the at least one flange is clamped against the at least one track flange so as to lock the assembly to the track;
   e. a cap attached to the rod, the cap being visible above the base frame when the cam is in the first position and not visible above the base frame when the cam is in the second position;
   f. a cam follower cooperating with the cam;
   g. at least one disc spring interposed between the cam follower and the rod; and
   h. means, comprising a coil spring circumscribing the rod, for biasing the rod and plunger upward.

* * * * *